United States Patent [19]

Tate et al.

[11] 4,379,688

[45] Apr. 12, 1983

[54] ORIENTED INJECTION BLOW MOLDED CONTAINER PRODUCTION

[75] Inventors: Dennis J. Tate, Grand View; Henry Trevino, Kansas City, both of Mo.

[73] Assignee: Ethyl Development Corporation, Richmond, Va.

[21] Appl. No.: 301,834

[22] Filed: Sep. 14, 1981

[51] Int. Cl.³ .............................................. B29C 17/07
[52] U.S. Cl. .................................... 425/526; 264/532; 264/538; 425/529; 425/533; 425/535
[58] Field of Search ............. 425/526, 529, 533, 535; 264/532, 537, 538

[56] References Cited

U.S. PATENT DOCUMENTS

| | | |
|---|---|---|
| 2,853,736 | 9/1958 | Gussoni . |
| 3,212,130 | 10/1965 | Elphee ............................ 425/535 X |
| 3,776,991 | 12/1973 | Marcus ........................... 264/532 X |
| 4,063,867 | 12/1977 | Janniere ............................. 425/526 |
| 4,144,013 | 3/1979 | Simmons ............................ 425/533 |
| 4,180,379 | 12/1979 | Rainville ......................... 264/538 X |

FOREIGN PATENT DOCUMENTS

2351773 12/1977 France .............................. 425/533

*Primary Examiner*—Jan H. Silbaugh
*Attorney, Agent, or Firm*—Donald L. Johnson; John F. Sieberth; Edgar E. Spielman, Jr.

[57] ABSTRACT

An injection blow molding apparatus capable of achieving biaxial orientation and the produced article is disclosed. The apparatus features a transport table rotatable about and reciprocally movable along its center axis and at least an injection molding station and a blow molding station positioned adjacent to and around the transport table. There is at least one core rod mounted to the transport table, which core rod is moved from the injection molding station to the blow molding station by the table movements. The core rod coacts with the injection molding station to form an injection molded parison which is transported on the core rod to the blow molding station. At the blow molding station, a stretch pin mounted within the core rod is utilized to aid in the biaxial orientation of the final article blown at the blow mold station.

11 Claims, 6 Drawing Figures

ORIENTED INJECTION BLOW MOLDED CONTAINER PRODUCTION

BACKGROUND OF THE INVENTION

1. Field of the Invention

This invention relates to a process and apparatus for producing blow molded oriented plastic containers which utilizes injection molded parisons which are longitudinally stretch oriented at the blow station prior to final blowing.

2. Description of the Prior Art

There has been longtime commercial acceptance of processes that manufacture injection blow molded articles in a continuous manner wherein a parison is injection formed about a mandrel at a first station, transferred on the mandrel to a second station, where the parison is blown to form the desired article, and then subsequently transferred to a third station for stripping the formed article from the mandrel. Exemplary of such a process is the one described in U.S. Pat. No. 2,853,736.

However, due to the demands of the marketplace, which calls for high strength low weight articles, it has been necessary for the producer to gear his operation to produce biaxially oriented articles. Today, the vast majority of the commercial containers on the market, particularly those made from polyethylene terephthalate, have been made by utilizing preformed cylindrical parisons which are biaxially oriented by stretching the parison and blowing same after the parison has been heat conditioned so that it is at its biaxial orientation temperature. The formation of the parison occurs separately from the heat treat, stretch and blow steps. These machines, unfortunately, are highly complexed, need large floor space and/or require high capital investment.

A commerically available apparatus marketed by Rainville Company Inc. and which functions similar to the apparatus described in U.S. Pat. No. 3,881,854 is characterized in that it is relatively simple in operation and construction, it requires relatively small floor space and it is relatively inexpensive. However, this apparatus as presently marketed does not produce a biaxially oriented article.

There is a need, therefore, for an apparatus and process capable of producing a biaxially oriented article which apparatus and process have the beneficial features of the above-mentioned commercial Rainville apparatus.

SUMMARY OF THE INVENTION

It is the object of the present invention to provide a process and apparatus for producing injection blow molded biaxially oriented plastic articles in an efficient and economical manner.

It is another object of the present invention to provide a process and apparatus for producing injection blow molded biaxially oriented plastic articles wherein all steps of article formation occur on a single apparatus.

It is also an object of the present invention to provide a method and apparatus for producing injection blow molded biaxial oriented plastic articles wherein the apparatus and process utilize in part basic existing equipment.

The foregoing objects are achieved by providing a transport table rotatable about and reciprocally movable along its center axis. Positioned around the periphery of the transport table is at least an injection molding station, for injection forming a parison, and a blow molding station, for effecting blow forming of the injection molded parison to its final desired shape. At least one hollow core rod is provided on the transport table for accomplishing three functions, i.e., it defines a part of the injection mold cavity when nested in the split injection mold, it holds the parison as it is transported from station to station and it provides for the placement and use of a stretch pin to accomplish the biaxial orientation of the blown article.

The versatility of the apparatus of this invention allows for the use of other stations. For example, at least a heat treating station for temperature conditioning of the parison may be used. Such a station would be positioned adjacent the transport table and at a point between the injection molding station and the blow molding station. Further, a stripper station for removal of the blow molded article from the hollow core pin subsequent to the blow molding station may be provided.

In a preferred form, the apparatus of this invention utilizes a stretch pin which is hollow so that there is provided a conduit for the passage of blow air into the parison. The blow air may be introduced subsequent to or contemporaneously with the longitudinal stretching of the parison. When there is contemporaneous introduction of the blow air, the parison will undergo axial and radial stretch at the same time to effect the desired biaxial orientation. If the stretch pin stretches the parison prior to the introduction of the blow air, the parison will be axially and then radially stretched to achieve the biaxial orientation. (To achieve the longitudinal and outwardly movement of the stretch pin, there is provided a powered mechanism which is brought into association with the stretch pin to effect such movement.)

The hollow portion of the core rod is positioned in general alignment with the longitudinal axis of the rod. The stretch pin slidably mounts within this portion, with the distal end being used for association with the article during stretching and with the proximate end being used for association with the powered mechanism. Since the hollow core rod is utilized at the injection mold station to aid in defining the injection mold cavity, the hollow portion thereof must be sealed off so it will be protected against intrusion by the molten injected thermoplastic material. This is accomplished by having the distal end of the stretch pin to make sealing contact with the distal or outermost extent of the hollow portion. Also, since the stretch pin is freely slidable within the hollow core rod, it is preferred that a locking mechanism be provided to lock the stretch pin in its seal position with respect to the hollow core rod. For the sake of simplicity, it has been found that such locking mechanism can be preferably attached to the table in a position of locking engagement with the stretch pin. The unlocking structure can be located adjacent the powered mechanism to effect unlocking of the stretch pin so that it may be longitudinally moved in response to the powered motion of the powered mechanism.

Operation of the apparatus of this invention is the paragon of simplicity despite the fact that the highly desirable biaxial orientation function is accomplished. Initiation of the apparatus cycle occurs with the positioning of the hollow core rod between a split injection mold. The injection mold is closed about the core rod to form the injection mold cavity. Molten thermoplastic material is injected into the cavity to yield the parison. The split injection mold is opened and the transport table is moved upwardly and rotated with the parison still mounted to the hollow core rod. If a heat treatment station is desired, the transport table rotation is stopped at this station so that the temperature of the parison can be effected. Following the heat treatment, the transport table is raised and then rotated to position the parison adjacent a split blow mold. It is important to note that up to this point the stretch pin is in a retracted position and locked in that position by the locking mechanism. (By being retracted and locked, the hollow portion is sealed from intrusion of thermoplastic material.) The transport table is then lowered so that the parison will be properly aligned and positioned between the split blow molds. Upon lowering the transport table, the locking mechanism is caused to unlock so that the stretch pin is free to move outwardly from the hollow core rod. The powered mechanism achieves powered association with the stretch pin to cause it to move in a direction towards the bottom of the parison. As mentioned previously, at this point, blow air can be introduced simultaneously with or subsequent to movement of the stretch pin. Whichever mode is desired, the result is that the parison is blow molded to the shape of the cavity defined by the split blow molds and is biaxially oriented. After the blowing step is finished, the blow molds separate and the transport table moves upwardly. Rotation of the transport table then carries the hollow core rod (which at this point is holding the final article) to the station at which the article is removed from the hollow core rod. The transport table rotates from the stripping station so as to position the hollow core pin back at the injection molding station so that the sequence can start again.

These and other features of this invention contributing to satisfaction in use and economy in manufacture will be more fully understood when taken in connection with the accompanying drawings in which identical numerals refer to identical parts and in which:

Figure 1:
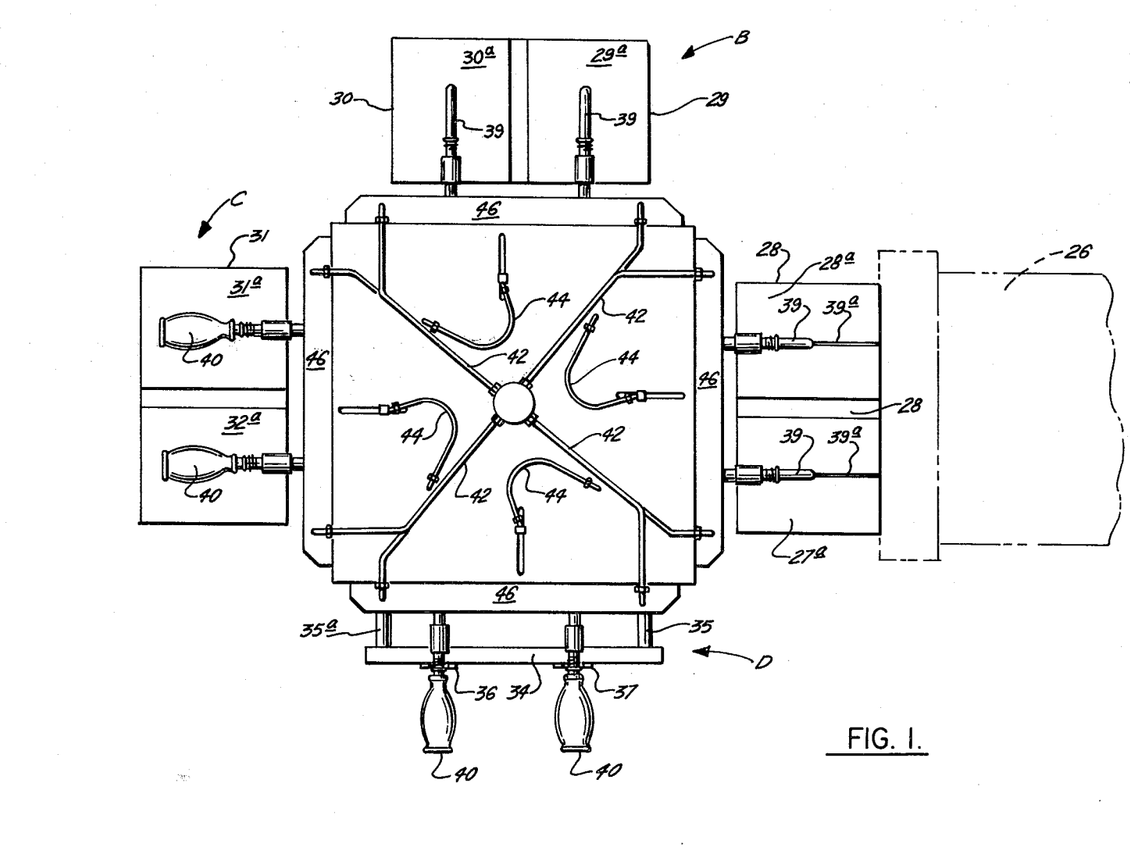
FIG. 1 is a view of the apparatus of the present invention with the upper half of the various mold assemblies removed for a clearer view.
Figure 2:
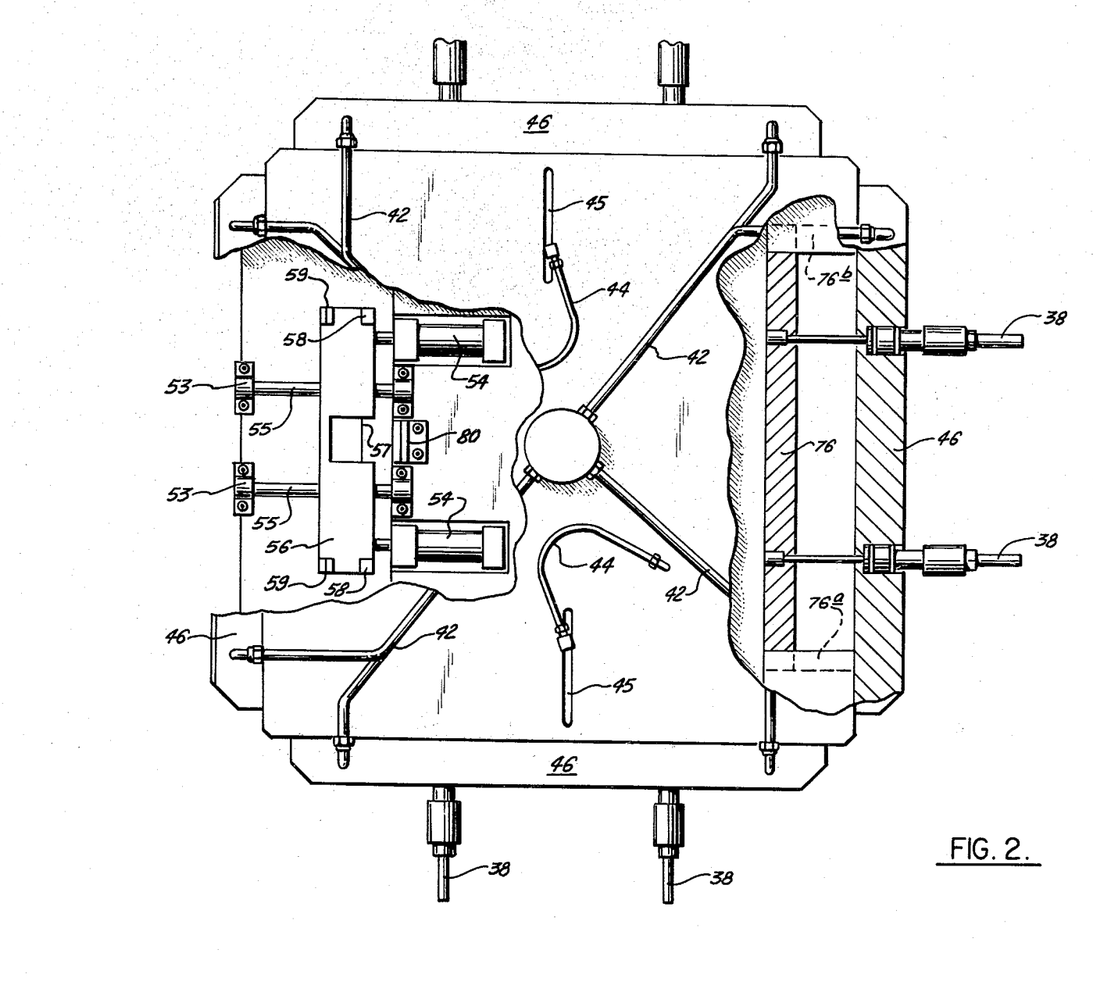
FIG. 2 is a top view in partially broken section of the rotating table assembly of the present invention.

Referring now to FIGS. 1 and 2, there can be seen an injection blow molding apparatus of this invention, generally designated by the numeral 20. Apparatus 20 includes a transport table, generally designated by the numeral 22, an injection molding station, generally designated by the letter "A" and a blow molding station, generally designated by the letter "C". For the embodiment shown in the drawings, there is also provided, a temperature conditioning station, generally designated by the letter "B" and a stripping station, generally designated by the letter "D". As can be seen in FIG. 1, stations A, B, C and D are positioned around transport table 22 so they may coact therewith. Transport table 22 is powered for rotation and vertical movement about its center axis. Since it will be desired that transport table 22 be capable of stopping at each of the aforedescribed stations, these movements will be indexed and timed so that the necessary operations can be performed at each station. As can be seen in FIG. 1, transport table 22 has four operating sides, all of which are identical to one another. (For the sake of simplicity, identical numerals identify parts having identical configuration and function.) However, it is to be understood that transport table 22 can have any number of operational sides. The number of sides utilized will be dependent upon the number of stations positioned around transport table 22 and whether or not all of the stations will be in operation simultaneously. For example, it is possible to utilize only one operational side if the stations operate sequentially—however, such use would not be efficient.

On the top portion of transport table 22, there is provided cooling water conduits 42 and blow air conduits 44, the latter of which are slidably positioned within slots 45. The cooling water provided through cooling water conduits 42 is utilized to achieve desired core rod cooling. The blow air which passes through blow air conduits 44 will be utilized at blow molding station C to effect inflation of the parison within the blow mold.

Rigidly affixed to transport table 22 at mounting bar 46 are hollow core rods 38. Hollow core rods 38 are affixed so that they are rigidly mounted. It is to be understood that a lesser or larger number of core rods may be mounted depending upon the space available for the various stations and also the size of the article to be formed.

Within each hollow core rod 38, there is a longitudinal axially aligned hollow bore into which there is slidably received stretch pin 70. Stretch pin 70 has at its distal ends blow air ports 71. Note also that the distal end of stretch rod 70 is conically shaped. A hollow conical recess is to be found within the distal end of the hollow bore of hollow core rod 38. This hollow conical recess mates with the conically shaped end 73 of stretch pin 70 to form a seal between pin 70 and core rod 38 when pin 70 is in the retracted position, which position is seen in FIGS. 3 and 4.

The rotation and vertical movement of transport table 22 is transferred through drive shaft 23 which is in association with drive mechanisms which are of conventional design. (See FIGS. 3–5.) Collar 24 is utilized to achieve the attachment between transport table 22 and drive shaft 23. Drive shaft 23 is supported by mounting block 25 which in turn is carried by conventional support structure.

Since it will be desired to have stretch pin 70 in the outward position (shown in FIG. 5) only at the blow molding station, it is necessary to provide locking structure, generally designated by the numeral 60, to maintain stretch pin 70 in the retracted position throughout the other portions of the cycle. Also, this structure is used to maintain the sealed relation between the end 73 of stretch pin 70 and the distal end of hollow core rod 38. Locking structure 60 is shown in FIGS. 3–5 and comprises a pivotally mounted lock lever 75 having at its end first locking boss 72. Lock lever 75 is pivotally mounted to pivot pin 68 which is carried in lock block 52. Biasing lock lever 75 in an upward direction is spring 64. Mating with first locking boss 72 to achieve the desired lock is second locking boss 74, which latter boss is mounted to downwardly project from slide bar 76 which is slidably mounted within track 76a and 76b as seen in FIG. 2. The operation of locking structure 60 will be hereinafter described.

Figure 3:
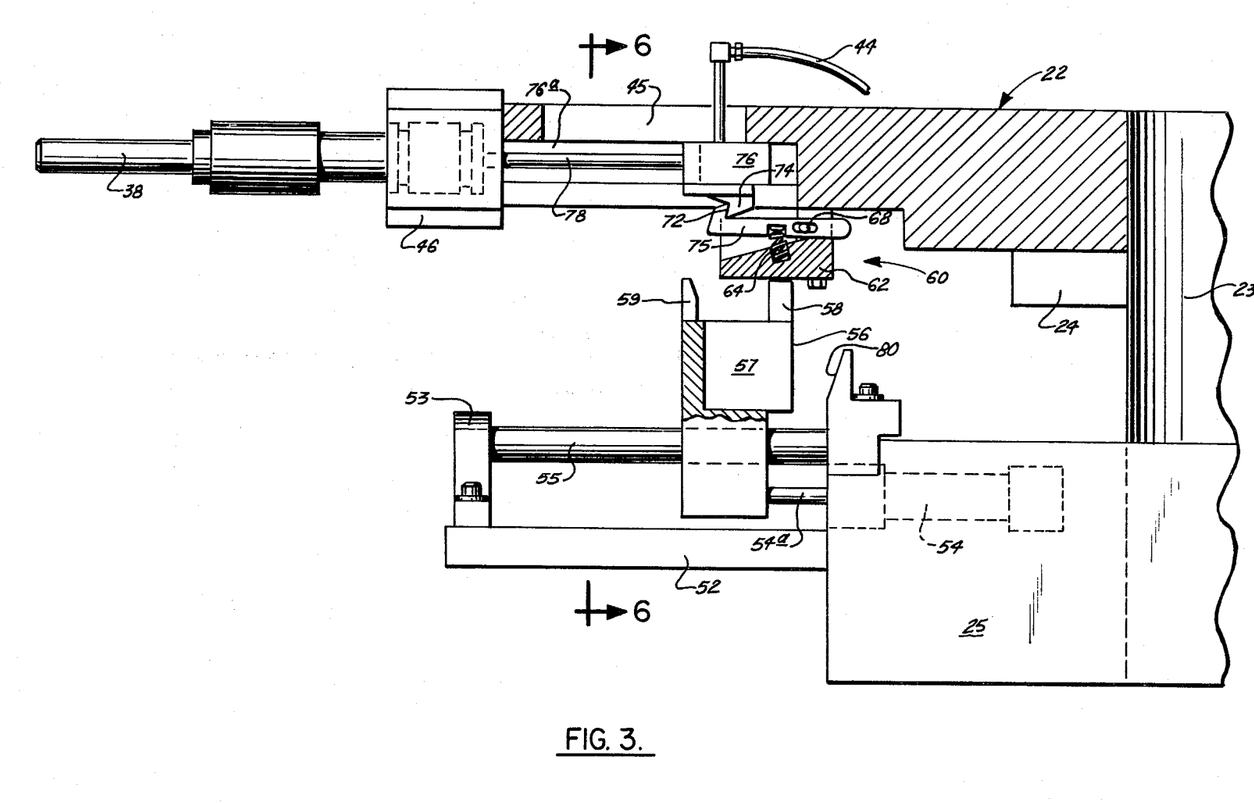
FIG. 3 is an enlarged side elevational view of the side of the table mechanism and base assembly which is adjacent to the blow station with the transport table shown in the uppermost position.
Figure 4:
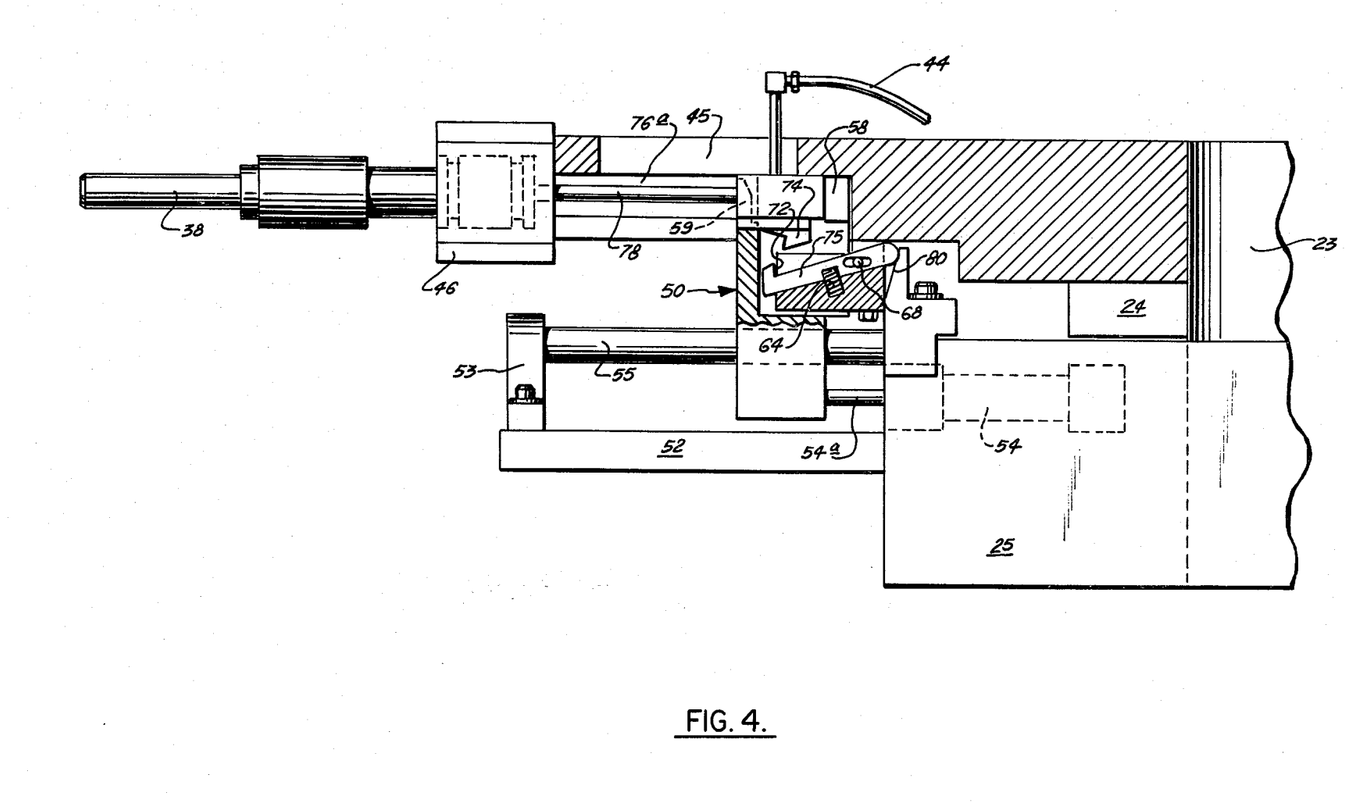
FIG. 4 is a view similar to FIG. 3 with the transport table in its lowermost position.
Figure 5:
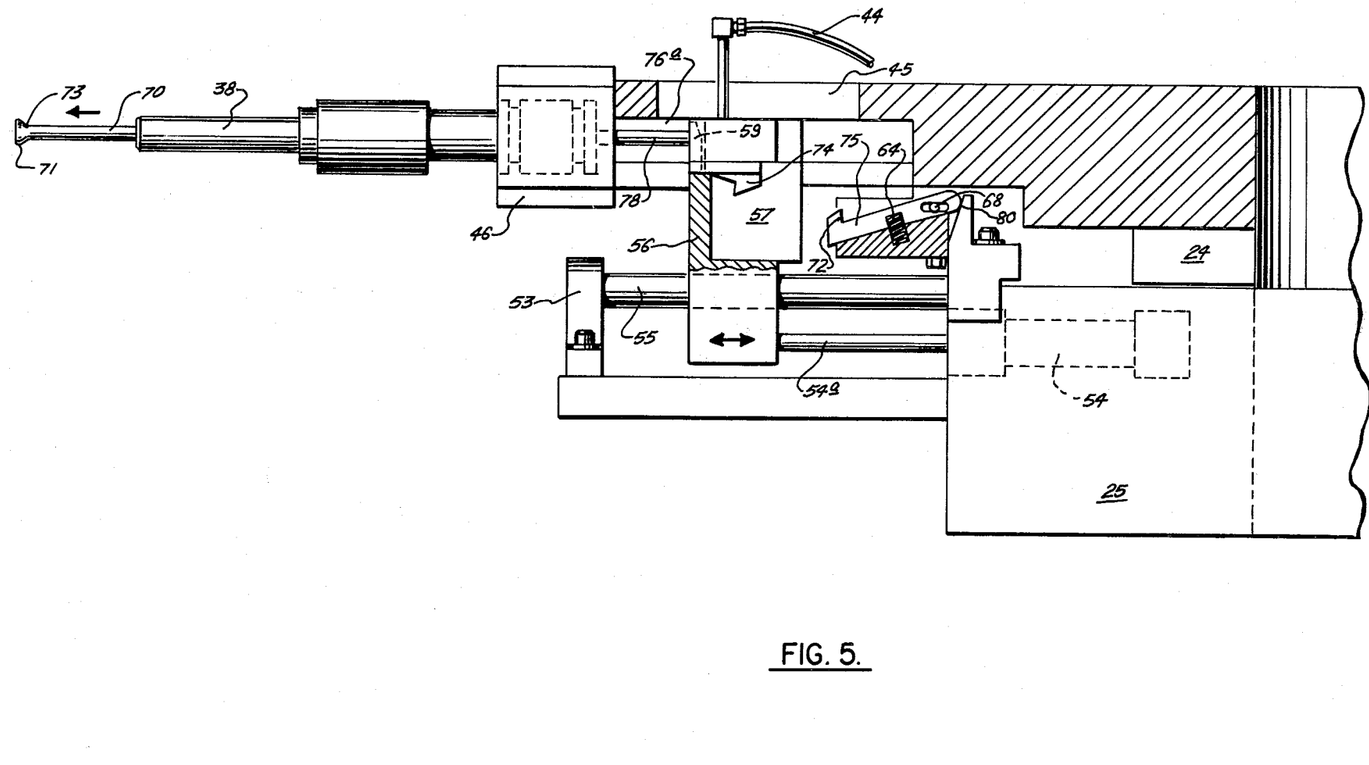
FIG. 5 is a view similar to FIG. 4 showing the apparatus with the stretch pin of the core rod in its extended position.
Figure 6:
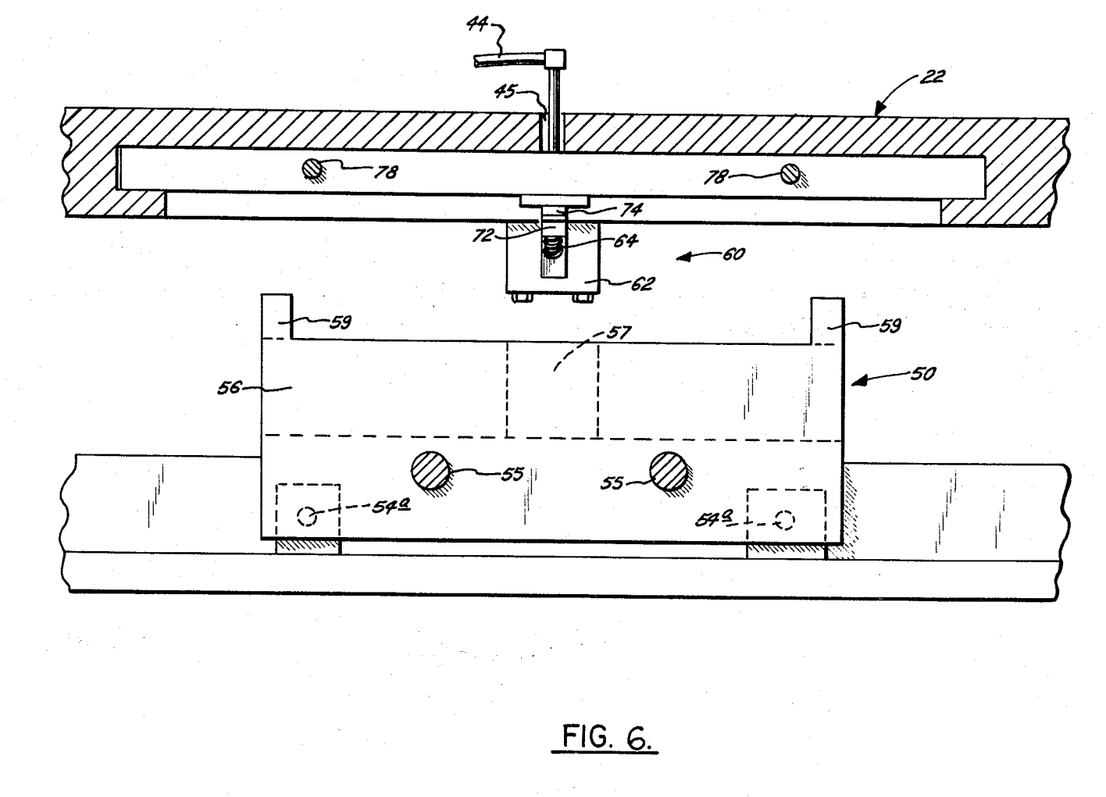
FIG. 6 is an enlarged partially broken view of the apparatus of the present invention taken along section line 6—6 in FIG. 3.

As can be seen in FIGS. 3-5, connecting rod 78 is attached to slide bar 76. Connecting rod 78 is attached to stretch pin 70 so that the motion of one is followed by the same motion of the other. Thus, movement of slide bar 76 outwardly results in outward motion of stretch pin 70.

To provide motion to slide bar 76 and thus to stretch pin 70, there is provided a powered mechanism, generally designated by the numeral 50, which is shown in FIGS. 3-6. This mechanism comprises an elongated bar having recess 57 therein which recess is dimensioned to accommodate a portion of locking structure 60 when transport table 22 is lowered. (See FIGS. 4 and 5.) Also, bar 56 has at each of its ends upstanding spaced-apart ears 58 and 59. Ears 59 achieve engagement with the front face of slide bar 76 when transport table 22 is in the lowered position. Ears 58 achieve engagement with the rearward face of slide bar 76. Thus, outward and inward motion of bar 56 requires that slide bar 76 will follow same due to the interfering engagement of the beforedescribed ears with slide bar 76.

To give movement to bar 56, there is provided double acting pneumatic cylinder 54 which is mounted to mounting block 25 as is seen in FIGS. 3-5. Bar 56 is slidably mounted to track rods 55 to insure fidelity and direction of movement. Track rods 55 are held in position by mounting to brackets 53 which are in turn held in position by shelf 52 which is connected to mounting block 25.

Upon starting of the initial cycle, hollow core rods 38 will be empty. Also, the split injection molds 27 and 28 at the injection molding station A, and the split heat treatment molds 29 and 30 at the heat treatment station B, and the split blow molds 31 and 32 at the blow molding station C will be in the open position. (In FIG. 1, only the bottom halves of the various split molds are shown for the sake of clarity of view.) Transport table 22 is then moved to the lowered position so that hollow core rods 38 are nested within the various beforedescribed split molds. At injection station A, hollow core rods 38 are then enclosed by downward movement of the upper halves of split injection molds 27 and 28 onto the lower halves 27a and 28a. Closing of the injection molds about core rods 38 results in the formation of injection mold cavities and molten thermoplastic material is injected thereto through ways 39a and 39a from injection molding extruder 26. The molten thermoplastic material will fill the cavity and upon cooling will form parisons 39 which will be mounted to hollow core rods 38. The upper halves of injection molds 27 and 28 are raised so that transport table 22 can move upward vertically to clear parisons 39 for movement to the next station. Transport table 22 rotates to achieve this movement and parisons 39 are positioned to be received by heat treatment split molds 29 and 30. The position of the parisons with respect to these molds is shown in FIG. 1 wherein the lower halves of the molds 29a and 30a are shown. After heat treatment, generally used to bring parisons 39 to their biaxial orientation temperature, the upper halves of heat treatment molds 29 and 30 are moved upwardly. Transport table 22 is then moved upwardly for clearance of parisons 39 so that they may be moved to blow molding station C by rotation of transport table 22. At blow molding station C, unlocking of the stretch pin occurs. First, parisons 39 are positioned so that they are within the blow mold cavities which will define the final shape of the article. The upper halves of blow molds 31 and 32 are lowered onto the lower halves 31a and 32a. When transport table 22 moves downwardly, the unlocking of stretch pin 70 occurs as seen in FIG. 4. As the transport table 22 is moved downwardly, the rearmost extent of lock lever 75 engages unlocking cam 80 which causes first locking boss 72 to be lowered out of engagement with second locking boss 74. In FIG. 5, outward movement of stretch pin 70 is shown which is caused by the powered extension of piston arm 54a. Ears 58 push slide bar 76 and thus rod 78 outward which results in outward movement of stretch pin 70. Also, blow air is introduced to stretch rod 70 by way of a hollow passage through rod 78 which is in communication with blow air conduit 44.

After the parison has been inflated, the double acting pneumatic cylinder 54 causes contraction of cylinder rod 54a thereby engaging ears 59 with slide bar 76 to return it to the position shown in FIG. 4. Upon completion of cooling of the blow parison, the upper blow mold split halves are moved upwardly and transport table 22 is also moved upwardly. This upward movement results in the rearmost extent of lock lever 70 disengaging with unlocking cam 80 so that biasing spring 64 can return first locking boss 72 and second locking boss 74 to locking engagement as is seen in FIG. 3. At this time, the distal end of stretch pin 70 forms a seal at the end of core rod 38. Transport table 22 completes the final indexed rotation of the cycle so that the blown article is at stripper station D. As can be seen in FIG. 1, stripper station D comprises a pair of yokes 36 and 37, which are dimensioned to achieve stripping interference with article 40 when they are moved outwardly. This outward movement is achieved by attaching yokes 36 and 37 to bar 34 which in turn is mounted to cylinder rods 35 and 35a which are part of double acting pneumatic cylinders which are not shown. After articles 40 have been removed from core rods 38, the empty core rods are returned to injection molding station A so the cycle may be repeated.

What is claimed is:

1. An apparatus for producing injection blow molded biaxially oriented plastic articles from plastic parisons comprising:
   a. a frame member;
   b. a transport table mounted to said frame member for rotational movement about and reciprocally along the central axis of said transport table;
   c. a table power means associated with said transport table for effecting said rotational and reciprocal movements;
   d. at least one transversally extending hollow core rod fixedly mounted on said table, said rod having a longitudinally extending hollow portion and said rod having first sealing means at its distal end;
   e. an elongated stretch pin movably mounted in said hollow portion and said stretch pin having,
      i. at its distal end second sealing means for cooperation with said first sealing means to achieve a seal between said first and second sealing means,
      ii. first locking means in mounted relationship with the proximate end of said stretch pin, and
      iii. first engagement moving means associated with said stretch pin whereby movement of said first engagement moving means causes movement of said stretch pin in said hollow portion;

f. a second locking means mounted to said transport table for cooperation with said first locking means to lock said stretch pin from movement when said stretch pin is in the position within said hollow portion to achieve said seal between the said first and second sealing means;

g. a second engagement moving means movably mounted to said frame member for engagement with said first engagement moving means when said transport table is in its lowered position at the blow molding station of (h);

h. a power means for moving said second engagement moving means when it is in said engagement with said first engagement moving means whereby said movement of said stretch pin in said hollow portion is effected, said seal is broken and the distal end of said stretch pin is moved a distance sufficient to cause axial stretch of said plastic parison carried by said core rod;

i. unlocking means mounted to said frame member for unlocking said lock between said first and second locking means when said transport table is in its lowered position at the blow molding station of (h);

j. an injection molding station adjacent said transport table for receipt of said hollow core rod so that said parison can be injection formed on said hollow core rod; and k. a blow molding station for blow forming said article from said injection formed parison while said parison is on said hollow core rod, said blow molding station being located adjacent said second engagement moving means and said unlocking means.

2. The apparatus of claim 1 wherein there is additionally provided a first additional station between said injection molding station and said blow molding station and a second additional station between said blow molding station and said injection molding station and wherein said transport table is a four-sided table.

3. The apparatus of claim 2 wherein there is at least one hollow core rod mounted on each side of said table.

4. The apparatus of claim 2 wherein said first additional station is a heat treatment station for maintaining or bringing said parison temperature at or to its biaxial orientation temperature.

5. The apparatus of claim 1 wherein said stretch pin has a hollow bore for the passage of blow air at said blow molding station when said seal formed between said first seal means and said second seal means is broken.

6. The apparatus of claim 5 wherein said distal end of said stretch pin moves from the distal end of said core rod to its full length of travel before said blow air is introduced through said hollow bore.

7. The apparatus of claim 5 wherein said movement of the distal end of said stretch pin away from the distal end of said core rod is contemporaneous with the passage of blow air through said hollow bore.

8. The apparatus of claim 1 wherein said first sealing means is a conical surface on the distal end of said stretch pin and said second sealing means is a conical recess in the distal end of said core rod, said recess and said conical surfaces being shaped so that the nesting of said conical surface in said conical recess provides said seal.

9. The apparatus of claim 1 wherein said stretch pin is coaxially mounted to a rod, said rod having mounted to its distal end said first locking means and said first engagement moving means.

10. The apparatus of claim 9 wherein said first locking means comprises a downwardly facing boss and said second locking means comprises an upwardly facing boss, each of said bosses having opposed faces for achieving an interference lock therebetween.

11. The apparatus of claim 10 wherein said upwardly facing boss of said second engagement means is mounted adjacent one end of a pivoted lever which is biased to maintain the locked position between said boss faces and wherein said unlocking means comprises an upstanding unlocking cam for striking said other end of said lever when said transport table is in its lowered position to move said second locking boss face from its locking interference with said first locking boss face.

* * * * *